US007687006B2

(12) United States Patent
Manthei et al.

(10) Patent No.: US 7,687,006 B2

(45) **Date of Patent: *Mar. 30, 2010**

(54) FORM FOR CASTING CONCRETE BLOCKS AND OTHER OBJECTS

(75) Inventors: James A. Manthei, Petoskey, MI (US); Jeremy L. Manthei, Charlevoix, MI (US)

(73) Assignee: Rosetta Hardscapes, LLC, Charlevoix, MI (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/050,314

(22) Filed: Mar. 18, 2008

(65) Prior Publication Data

US 2008/0277559 A1 Nov. 13, 2008

Related U.S. Application Data

(63) Continuation-in-part of application No. 11/562,045, filed on Nov. 21, 2006, now Pat. No. 7,618,578.

(51) Int. Cl.
*B29C 39/36* (2006.01)

(52) U.S. Cl. ...................... 264/334; 249/66.1; 249/112; 249/127; 425/439; 425/440

(58) Field of Classification Search ................. 264/334; 425/439, 440; 249/66.1, 112, 127
See application file for complete search history.

(56) References Cited

U.S. PATENT DOCUMENTS 1,463,863 A * 8/1923 Zents .......................... 52/701
4,834,027 A * 5/1989 Meyer ........................ 119/771

* cited by examiner

*Primary Examiner*—Kat Wyrozebski
*Assistant Examiner*—Daniel Lee
(74) *Attorney, Agent, or Firm*—MacMillan, Sobanski & Todd, LLC

(57) ABSTRACT

A form for casting concrete blocks and other products having a resilient insert defining a cavity in which the block is cast and a rigid support or frame for the resilient insert. After the block has cured, the block is removed from the insert either by inverting the form to allow the block to fall from the insert or by lifting the block from the insert. One or more areas of the insert are tethered to the support with at least one generally flat flexible strap so that at least a portion of the insert is allowed to move a limited distance relative to the support and to deform to release the block. One end of each tether strap is embedded in the insert. After the cast block is separated from the insert, the insert is returned to a position wherein it is supported for casting another block.

15 Claims, 6 Drawing Sheets

FORM FOR CASTING CONCRETE BLOCKS AND OTHER OBJECTS

CROSS-REFERENCE TO RELATED APPLICATIONS

This is a continuation in part of U.S. patent application Ser. No. 11/562,045 filed Nov. 21, 2006.

STATEMENT REGARDING FEDERALLY SPONSORED RESEARCH OR DEVELOPMENT

Not Applicable.

TECHNICAL FIELD

The invention relates to a apparatus for casting concrete blocks.

BACKGROUND OF THE INVENTION

Concrete blocks may be formed with textured sides which may have undercuts. Because of the irregular surfaces, these blocks are not easily released from the form cavity in which they are cast. The shapes of the form cavity walls are such that the cured concrete block is locked within the form, even if the form is inverted. One method for releasing blocks with irregular surfaces from the form cavity is to hinge the side walls of the cavity so that the form walls may be pivoted away from the cast block after the concrete has sufficiently cured. This allows the block to be lifted from the form. Another method is to provide form walls which can be manually disassembled and separated from the block after it has cured, and reassembled for casting another block. The manual labor required to release or move the form sides from each block so that it can be removed from the form adds to the cost for manufacturing the blocks. It has been particularly difficult to manufacture large concrete blocks having highly irregular surfaces which have the appearance of natural stone. It is desirable to form some surfaces of the blocks with deep undercuts which imitate natural characteristics of stone.

BRIEF SUMMARY OF THE INVENTION

The invention relates method and apparatus for casting concrete blocks in which at least some of the surfaces of the block may be irregular. The cast concrete blocks may simulate natural stone blocks which have sufficiently irregular sides with recesses or shapes which are not easily released from conventional concrete block molds.

The apparatus may include a form having a rigid support for a resilient insert which forms a cavity in which the block is cast. The surfaces of the insert which define the cavity are textured to form the surfaces of blocks cast in the cavity, and may include portions which project some distance into the cavity. The support maintains the shape of the resilient insert when concrete is poured into the insert cavity and while the concrete cures. When a cast block is removed from the insert, a sufficient relief angle is provided between the frame and the insert to allow the insert to move a limited distance relative to the support. One or more areas of the insert are loosely secured to the support so that when the support is inverted, the insert will drop a short distance from the support or when the block is lifted the insert can lift a short distance above the support. According to one aspect of the invention, the insert is loosely secured to the support with at least one flexible webbing or straps which has an end embedded in the insert. After a concrete block cast in the mold insert cavity has cured, the support may be inverted so that the mold insert drops a short distance from its original position relative to the support. The weight of the block causes the resilient insert to deform and pull away from sides of the block, allowing the block to fall freely from the insert while the insert is suspended from the frame by the webbing or straps. When the support is returned to its original position, the insert will fall back to a position where it is supported for casting another block. Alternately, the block may be lifted, pulling the insert up a short distance so that it can deform to allow the block to be separated from the insert. Once the block separates from the insert, the insert will fall back to a position where it is supported for casting another block.

DETAILED DESCRIPTION OF THE INVENTION

Figure 1:
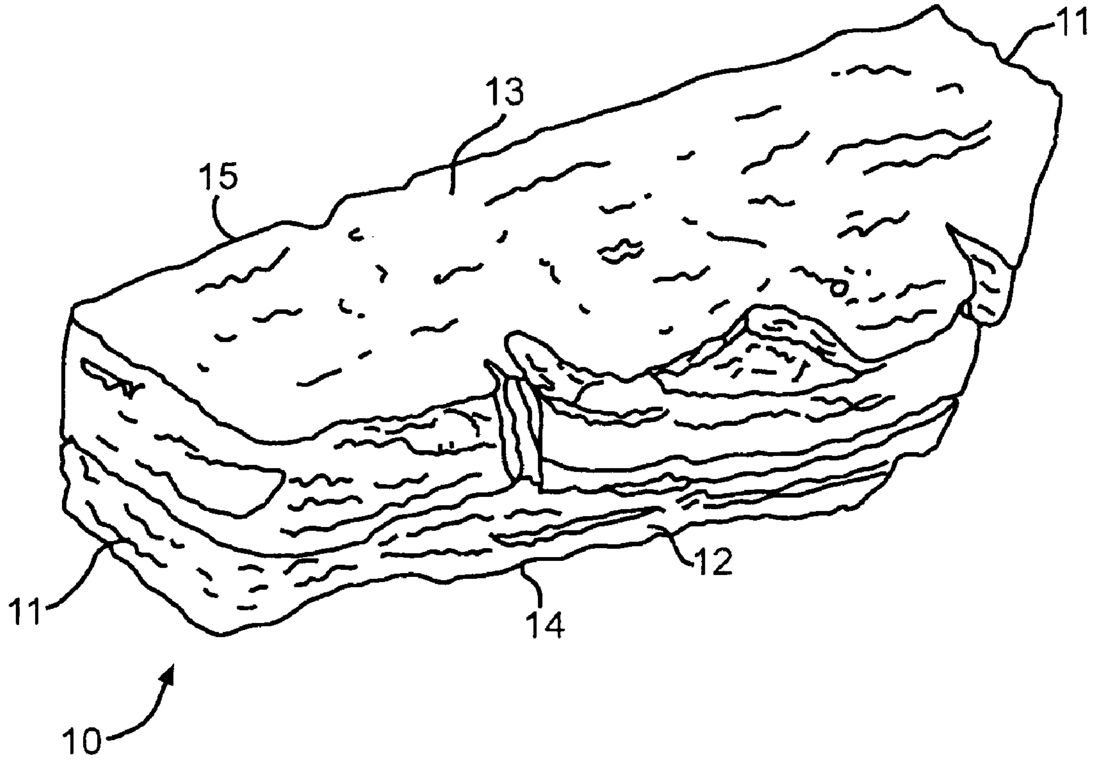
FIG. 1 a perspective view as seen from the upper front left of a retaining wall block which imitates a highly weathered sandstone block made according to the invention.

In the following description of the invention, certain terminology will be used for the purpose of reference only, and are not intended to be limiting. Terms such as “upper” and “lower” refer to directions in the drawings to which reference is made. Terms such as “top”, “bottom”, “horizontal”, and “vertical” describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 2:
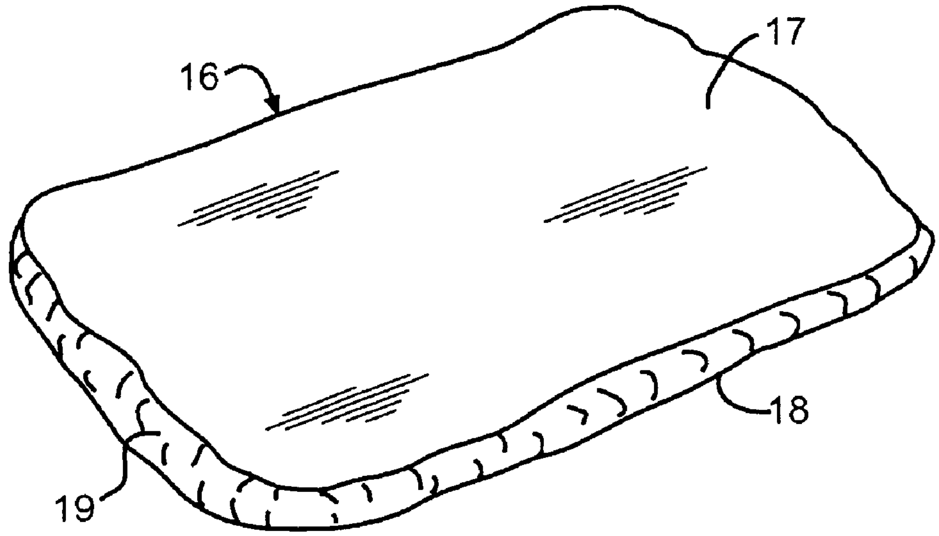
FIG. 2 is a perspective view of a paving stone which may be made according to the invention.

FIG. 1 of the drawings illustrates an exemplary cast concrete retaining wall block 10 which is formed to simulate a highly weathered sandstone block or other types of highly textured rock. The sides 11, front 12, top 13 and bottom 14 surfaces of the block may have numerous irregular undercuts and rounded edges which simulate fissures and erosion patterns in the block. For the illustrated block 10, a back surface 15 is formed by the surface of the wet concrete when it is poured into a form cavity. The back surface 15 will be generally flat. It will be appreciated that blocks may be formed to simulate other types of stones, and that they may be formed with any desired surface patterns, Or the invention may be used to cast blocks or articles which do not simulate stone blocks. The invention is particularly useful for casting concrete articles with shapes which make it difficult or impossible to remove the cast articles from a conventional mold cavity, such as articles with irregular undercut surface areas. The invention also may be used for casting flat concrete paving stones and steps, such as the paving stone 16 illustrated in FIG. 2 which has a generally flat top 17 and bottom 18 and generally rounded or irregular sides 19. The sides may prevent the paving stone 16 from releasing from a mold cavity. Blocks, paving stones, or other articles formed according to the invention may be relatively small, having a weight less than 100 pounds, or they may be quite large, having a weight greater than 2000 pounds.

Figure 3:
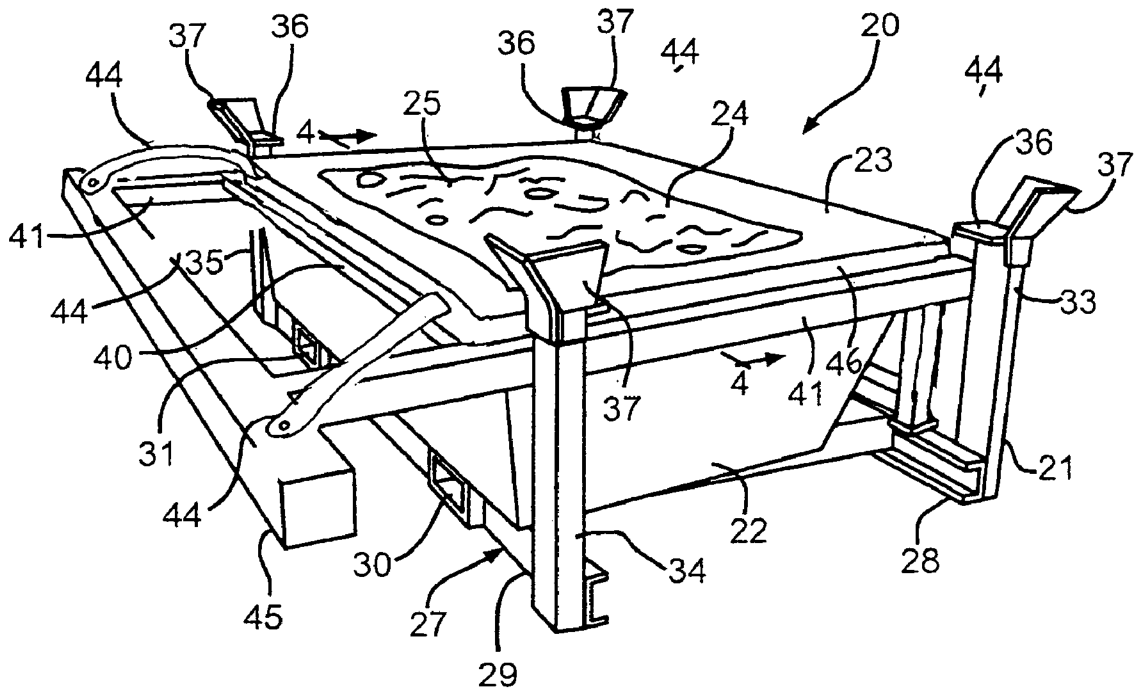
FIG. 3 is a perspective view as seen from an upper side of a form for casting concrete blocks in accordance with one embodiment of the present invention.
Figure 4:
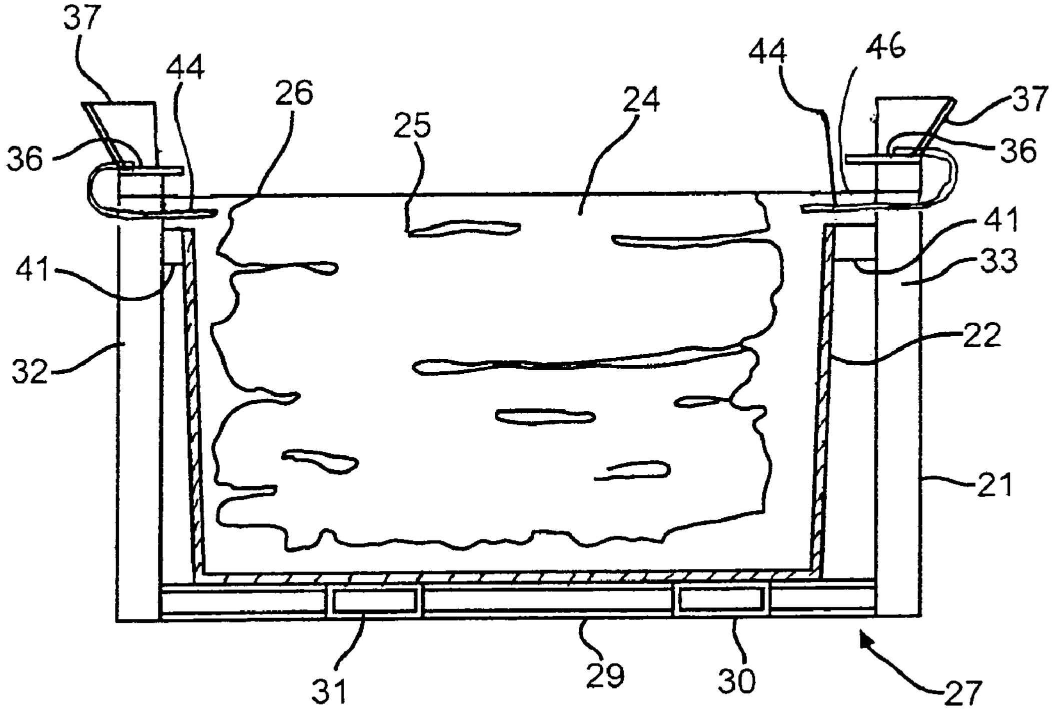
FIG. 4 is a sectional view taken along line 4-4 of FIG. 3.

FIGS. 3 and 4 show an exemplary form 20 in which a concrete block, such as the exemplary block 10, is cast in accordance with one embodiment of the present invention. The form 20 includes a rigid frame 21, a rigid support 22 which supports a resilient insert 23 while a block is cast in a cavity 24 formed in the insert 23. Interior surfaces 25 of the resilient insert 23 which define the cavity 24 are shaped and textured to impart a desired shape and surface configuration to blocks cast in the cavity 24. The support is designed to prevent flexing or distortion of the resilient insert while a block is cast in the cavity 23. According to the invention, the shape and size of the support 22 will depend on the shape, size and strength of the insert 23.

If the block cast in the cavity 24 is an imitation of a weathered natural stone, for example, the insert cavity surfaces 25 may be highly irregular with a number of projections for defining erosion grooves on the cast block surface. The cavity 24 has a top opening 26 through which the concrete is poured. Typically, the surface of the block at the top opening 26 will either be the back of a retaining wall block where the back is not visible, or the bottom of a block which is used where both front and back sides will be visible. As shown in FIG. 4, the cavity top opening 26 may have dimensions in at least some areas which are smaller than the maximum dimensions of the cast block.

Preferably, the frame 21 is made from steel since it must be rigid and support the weight of the cast block. However, it should be understood that the frame 21 may be made of any other suitable material having the required strength and durability. If the invention is used for casting small blocks, for example, wood or a plastic may be acceptable for the frame 21.

The exemplary frame 21 includes a base 27 having front and rear rails 28 and 29. The front and rear rails 28 and 29 provide longitudinal support and stability to the frame 21. The base 27 includes two spaced, parallel channels 30 and 31 which extend perpendicularly between the front and rear rails 28 and 29. The channels 30 and 31 have a rectangular cross section, closed sides and open ends for receiving the spaced tines of a forklift (not shown) used to transport and to invert the form 20, as is discussed in detail below. It should be appreciated that other constructions configurations may be used.

The exemplary frame 21 is shown as including four posts 32-35 which extend generally vertically from the base 27. The posts 32-35 provide vertical support and stability to the frame 21. Each post 32-35 is provided with a flat top 36 and an upwardly and outwardly flared edging 37. The posts 32-35 may be sufficiently high to allow the forms 20 to be stacked. The flared edging 37 helps to align the forms 20 as they are stacked. It should be understood, however, that the form 20 may have other configurations which cooperate with any portion of another form to stabilize and support the other from when stacked.

The frame 21 is illustrated as having two spaced, parallel side channels, tubes or rails 40 and two spaced, parallel side channels, tubes or rails 41. The channels 40 and 41 are connected together and to the corner posts 32-35 to form a rectangle which provides lateral support and stability to the frame 21. It should be understood that the frame 21 may include any number of support rails, tubes, channels, etc. in any suitable configuration the frame 21 with the necessary strength.

The illustrated rigid support 22 is shown formed from a plurality of steel panels 42 which are welded together. The number and arrangement of panels 42 will depend on the exterior shape of the resilient insert 23 and the amount of support which the insert requires to maintain its shape while an article is cast in the insert. The plates 42 may be secured to the frame 21 rather than to each other and may only support areas of the insert which require support. The support 22 also maybe formed in any other suitable manner, such as a one piece stamping or a mold. It should be understood that it may be only necessary to support the bottom of the insert 23, for example, if the cast product has a low height such as when casting paver blocks.

The rigid support 22 is connected to the frame 21 by welding, mechanical fasteners, or any other suitable mechanism that will secure the support 22 to the frame 21. The insert 23 has an outer surface 43 that generally conforms to and is supported by the interior of the support 22 without being retained by the support 22. In other words, there must be a sufficient relief angle where the insert 23 contacts the support 22 to allow the insert 23 to fall freely from the support 22 when the form 20 is inverted.

The resilient insert 23 may be composed of an elastomer, e.g. natural or synthetic rubber. It must be understood, however, that resilient insert 23 may be composed of any material suitable to support concrete during casting and with sufficient resilience to allow the material to be pulled away from the concrete and to return to it original shape when positioned in the support 22.

At least one or more points on the resilient insert 23 are moveably connected to the frame 21 or to the support 22 with at least one tether 44, with a plurality of tethers 44 illustrated. According to the invention, the tethers 44 are in the form of flexible webbing or straps each having an end embedded in the insert 23 and having an opposite end secured to the frame 21 or to the support 22. In the illustrated form 20, the tethers 44 are flexible straps attached to corners of the insert 23. At a front side of the form 20, ends of the tether straps 44 are embedded in the upper front corners of the insert 23 and opposite ends of the tether straps 44 are secured to the frame 21. Rear tether straps 44 are shown secured between at least the rear corners of the insert 23 and the frame 21. The tether straps 44 may be secured to any suitable portion of the frame by any desired method, such as with bolts.

The insert 23 may have outwardly extending edges 46 which surround the cavity opening 26. The edges 46 may be rectangular and the tether straps 44 be secured to the insert 23 at points adjacent the corners. If necessary, tether straps 44 also may be secured at other locations on the edges 46. In order to reduce stress on the resilient insert 23 and hence to extend the life of the resilient insert 23, an end of each of the tether straps 44 is embedded some distance into the edges 46 of the insert 23. By using flexible tether straps 44 which have ends embedded into the insert 23, the risk that the insert will tear when a block is dumped from the form 20. The flexibility of the tethers 44 disperses forces exerted between the tethers 44 and the insert 23 when the insert 23 is deformed.

The tether straps 44 may be of any suitable flexible material which has the strength and durability for supporting weight of the insert 23 and a cast block when the block is separated from the insert 23. For example, the insert may be a woven fabric web, or it may be formed of an extruded suitable plastic material such as polyethylene.

Figure 5:
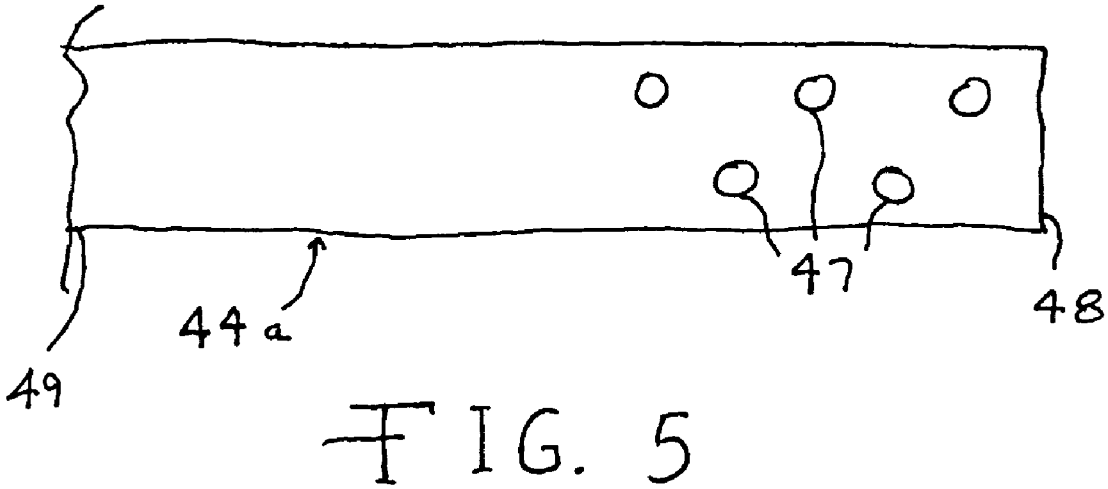
FIG. 5 is a top plan view of a single tether strap for securing an area of a resilient insert to the form frame.

As shown in FIG. 5, a tether strap 44*a* may include a plurality of spaced holes 47 in an end 48 which is embedded in the insert 23. The tether strap end 48 is embedded in the edge 46 of the insert 23. The holes 47 increase the bond between the insert 23 and the tether strap end 48 to prevent the tether strap 44*a* from pulling away from the insert 23. The flexibility of the tether strap 44*a* allows it to bend along with the edge 46 with minimum stress on the edge 46. An opposite end 49 of the tether strap 44*a* may be formed as desired for securing to the frame 21. For example, the end 49 may simply have an opening (not shown) for passing a bolt which secures the end 49 to the frame 21. Or the end 49 may be formed into a loop which can be secured with a cable or other means to the frame 21. For example, a D ring (not shown) may be attached to the tether strap end 49 and the D ring may be secured to the frame 21 with conventional shock cords (not shown).

Figure 6:
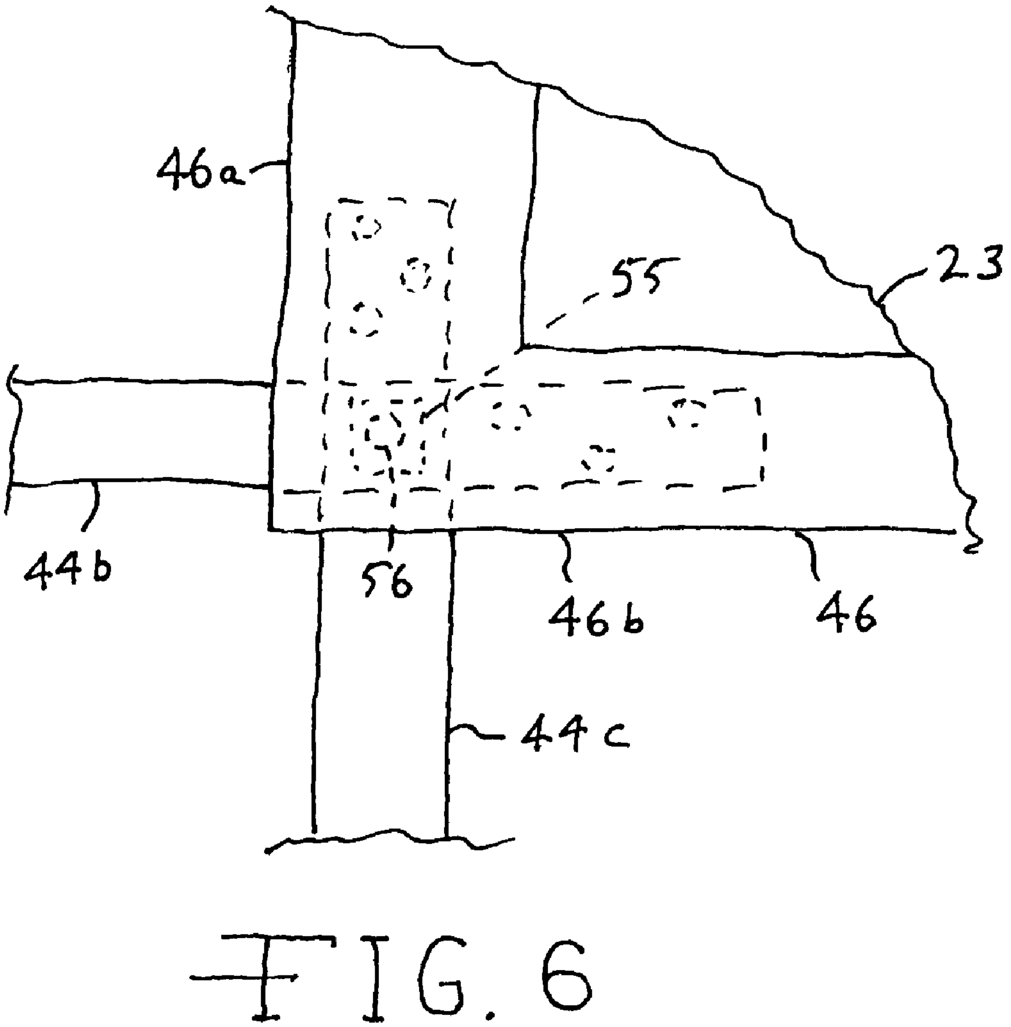
FIG. 6 is a fragmentary top plan view of a corner of the resilient insert with two tether straps embedded in the insert.

For added strength, two tether straps 44*b* and 44*c* may be embedded in the corners of the resilient insert 23, as shown in FIG. 6. At the corner, the straps 44*b* and 44*c* extend from adjacent edges 46*a* and 46*b* of the insert edge 46. For added strength, the straps 44*b* and 44*c* may be secured together where they cross, for example, with stitching 55 or with a grommet 56.

Figure 7:
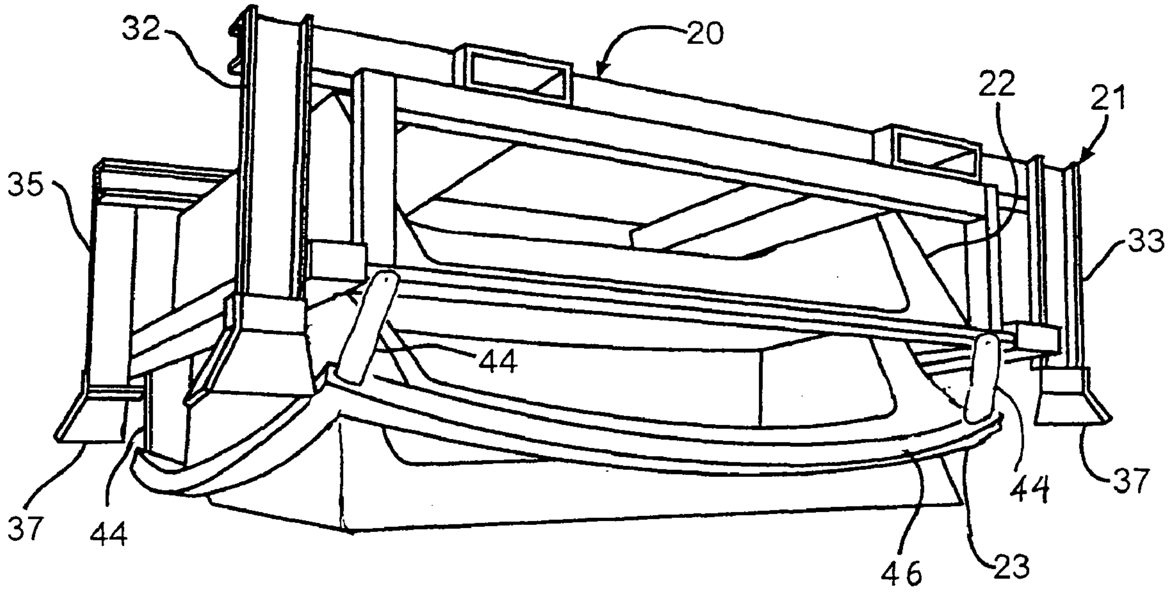
FIG. 7 perspective view as seen from a bottom side of the form of FIG. 1 inverted for removing a cast block from the form.

Referring to FIG. 7, a cured concrete block is shown being removed from the form 20 by inverting the form 20 above a surface which will catch the block. When the form 20 is inverted, the resilient insert 23 will fall from the form 20 to the extent permitted by the tether straps 44. Due to its resiliency, the insert 23 will be stretched from its corners and edges and will deform sufficiently to allow the block to fall from the insert cavity 24.

Figure 8:
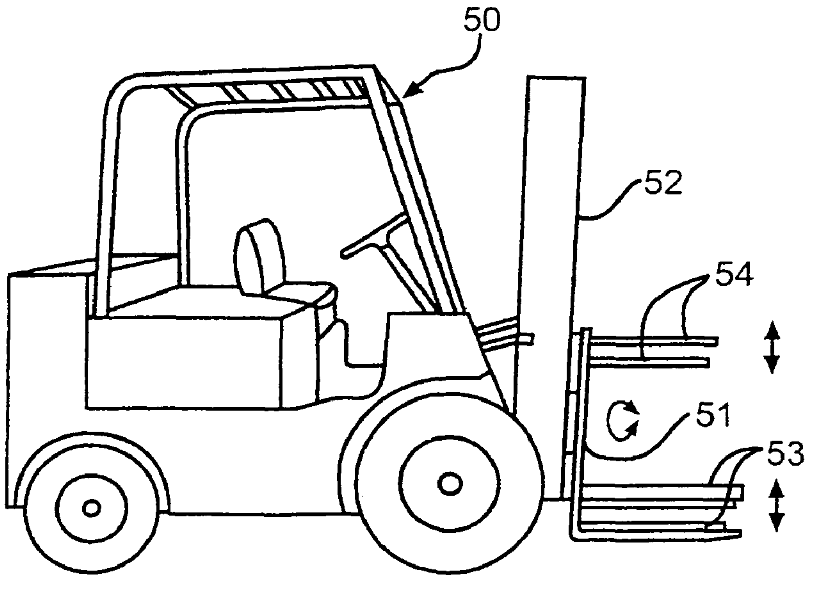
FIG. 8 is a perspective view of a fork lift for use in the method of the invention.

For large blocks which have a heavy weight, preferably a forklift is used to implement the method of the invention. A preferred type of forklift 50 is illustrated in FIG. 8. A basic conventional forklift has a pair of parallel tines which may be moved up and down on a generally vertical mast 52 which may be tilted over a limited range. On some forklifts, the tines also may be moved to change the spacing between the tines. The forklift 50 has an added feature of a mechanism 51 mounted on a mast 52. The mechanism 51 can be moved up and down on the mast 52 and can be rotated on the mast 52. A pair of tines 53 are mounted on the mechanism 51. In addition, a flat support plate or a second pair of tines 54 are mounted on the mechanism 51 for movement towards and away from the tines 53. A fork lift of this type is commercially available.

Figure 9:
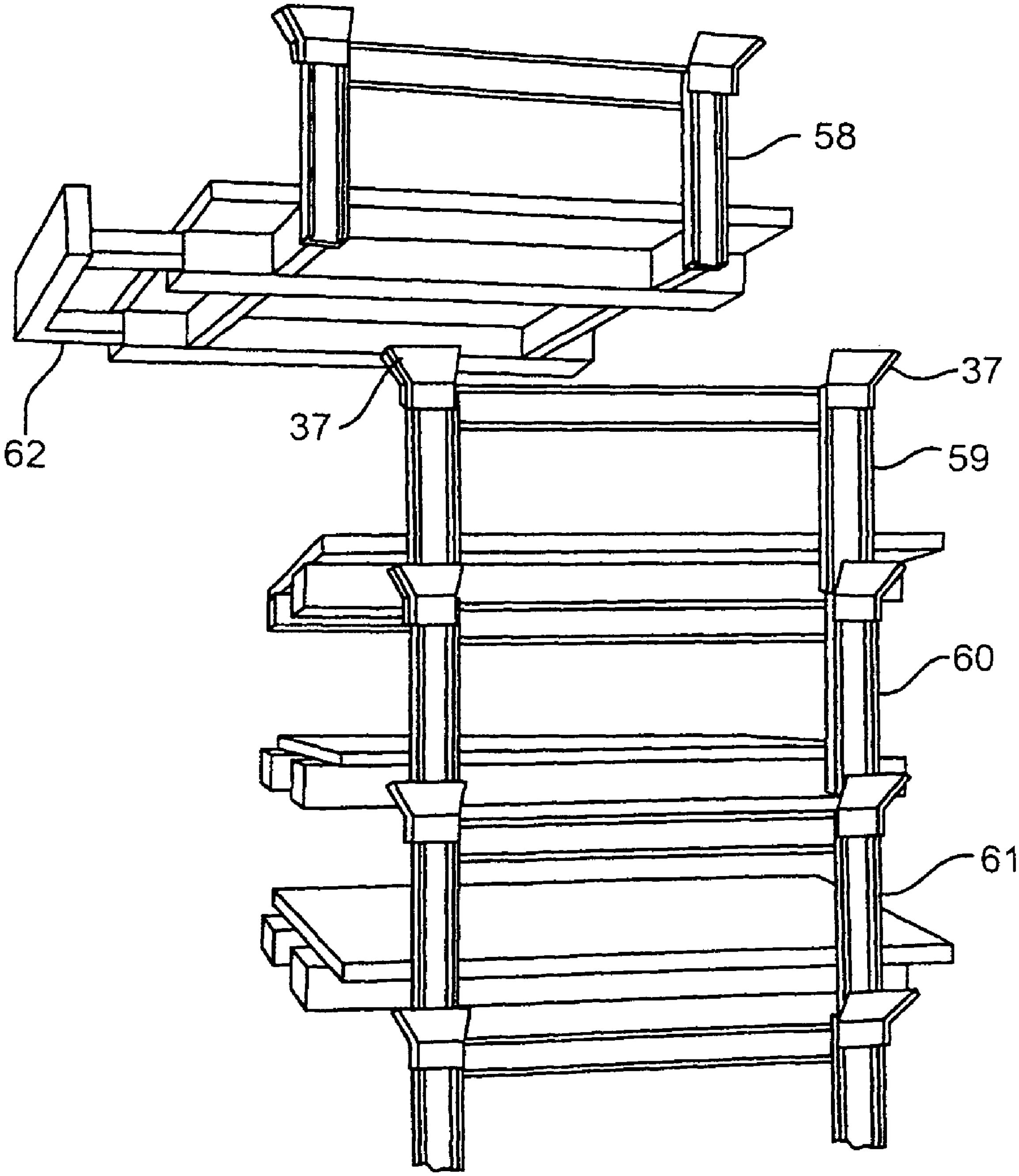
FIG. 9 is a perspective diagrammatic view showing forklift tines placing a form in which concrete has been poured on a stack of forms.

Referring to FIG. 9, a form 58 is shown being stacked on top of a stack of three forms 59-61. As the forms 58-61 are filled with wet concrete, they may be easily stacked while blocks cast in the forms cure. Either the forklift 50 or a basic forklift which only has tines which may be raised and lowered may be used to stack the forms 58-61. Only the tines 62 of the forklift are shown in FIG. 9. The flared edging 37 on the tops of the corner posts of the stacked form 59 facilitate alignment of the form 58 with the form 59.

Figure 10:
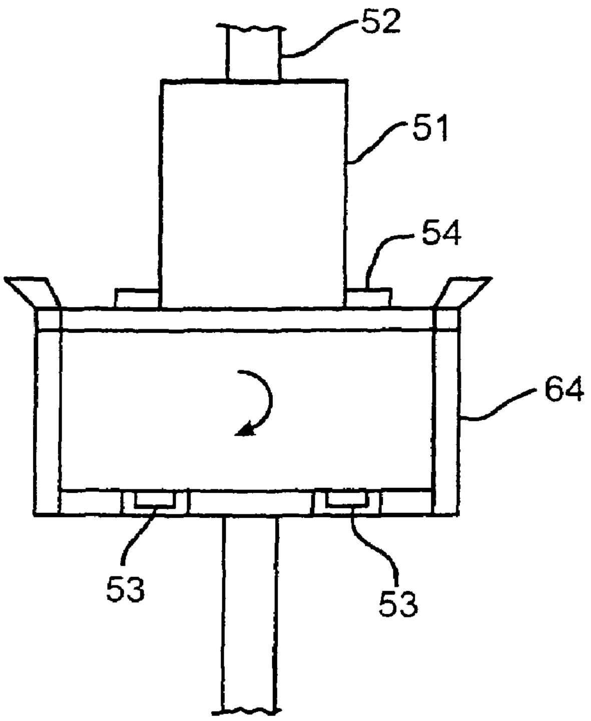
FIG. 10 is a fragmentary diagrammatic front view showing the form with a cured block as it is picked up by forklift.
Figure 11:
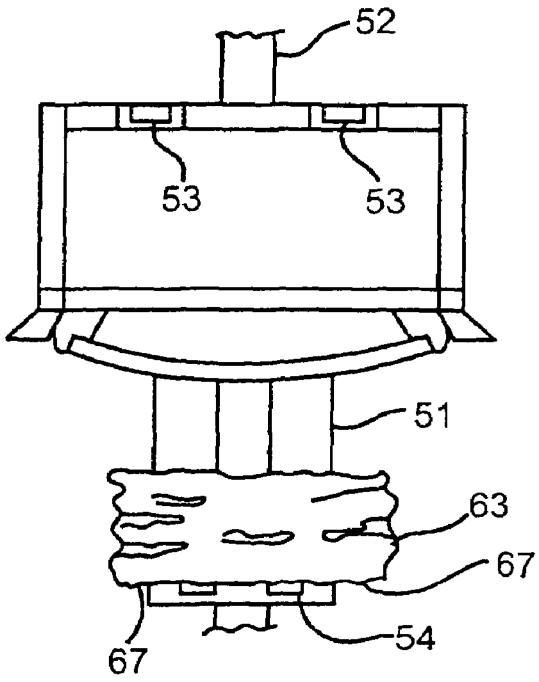
FIG. 11 is a fragmentary diagrammatic front view showing the form of FIG. 7 inverted on the forklift and separated from the cast block.

FIGS. 10 and 11 are fragmentary diagrammatic views show the process for removing a cured block 63 from a form 64 using the forklift 50 of FIG. 8. The form 64 is picked up by inserting the forklift tines 53 into the channels 65 on the form 64 and lifting. The second tines 54 are moved against the form 64 so that the form 64 is clamped between the forklift tines 53 and the second tines 54. The forklift mechanism 51 is then rotated 180° and the second tines 54 are lowered, as shown in FIG. 9. This allows a form insert 66 to fall from the form by the length of the tether and the cured block 63 to fall from the insert 66 to the second tines 54. The weight of the block 53 stretches and deforms the insert 66 so that any surface projections on the insert cavity surface will pull away from the block 63. The forklift may then be used to move the cured block to a storage area or to a transportation vehicle. Preferably, the block 63 overhangs edges 67 of the second tines 54. The overhanging may be lowered on blocks which space the block 63 above a support surface so that it can easily be picked up at a later time with a forklift.

In a modified embodiment of the invention, the cast block is lifted from the insert rather than inverting the support and insert to allow the block to fall from the insert. After a cast block has cured sufficiently, the block is lifted, for example, either by engaging the exposed top of the block with a vacuum lifter or by a chain or cable or other means secured to, for example, a lifting loop or hook or stud embedded in or otherwise secured to the block. As the block is lifted, the resilient insert lifts a short distance from the support. One or more tethers between the insert and the support limit movement of the insert as the block is lifted and also cause the insert to deform when the insert is restricted from further movement, so that the block can be pulled from the insert. Once the block separates from the insert, the insert will fall back to the support and is ready for casting another block.

It should be appreciated that the illustrated components of the frame 21 and of the rigid support 22 may be varied, combined or eliminated, so long as sufficient support is provided for the resilient insert 23 to prevent the insert 23 from deforming while a block or other article is cast and allowed to cure in the resilient insert. It also will be appreciated that various other modifications and changes may be made to the above described preferred embodiment of without departing from the scope of the following claims.

The invention claimed is:

1. A form for casting a concrete product including a rigid support, a resilient insert defining a cavity with surfaces shaped to provide a desired shape and texture to a product cast in said cavity, said resilient insert having an opening into said cavity, said support having a surface for supporting said resilient insert while a product is cast in said cavity, and at least one generally flat flexible tether strap securing at least one area of said resilient insert to said frame whereby, when a product cast in said insert is removed from said form, at least a portion of said resilient insert is free to move a limited distance from said frame and said tether strap allows said resilient insert to distort so that such cast product can separate from said resilient insert.

2. A form for casting a concrete product, as set forth in claim 1, and wherein said resilient insert has an edge surrounding said insert opening, and wherein an end of each of said at least one tether strap is embedded in said edge.

3. A form for casting a concrete product, as set forth in claim 2, and wherein said insert edge has a corner formed by first and second sides of said edge, wherein said end of a first tether is embedded in said insert so that said first tether extends from said first side, wherein said end of a second tether is embedded in said insert so that said second tether extends from said second side with said first and second tethers having crossing areas, and means securing said first and second tethers together at said crossing areas.

4. A form for casting a concrete product, as set forth in claim 3, and wherein said means securing said first and second tether straps together is a grommet.

5. A form for casting a concrete product, as set forth in claim 3, and wherein said means securing said first and second tether straps together is stitching.

6. A form for casting a concrete product, as set forth in claim 3, and wherein said crossing areas are spaced from said ends of said first and second tethers, and wherein a plurality of openings are formed in said first and second tethers between said crossing areas and said ends of said first and second tethers.

7. A form for casting a concrete product, as set forth in claim 2, and wherein a plurality of spaced openings are formed in the end of each tether strap embedded in said edge.

8. A form for casting a concrete product, as set forth in claim 1, and wherein each of said at least one generally flat flexible tether strap is formed from a woven fabric.

9. A form for casting a concrete product, as set forth in claim 1, and wherein each of said at least one generally flat flexible tether strap is formed from an extruded plastic.

10. A method for casting a concrete product comprising the steps of:

a) providing a resilient insert defining an upwardly opening cavity, said cavity having walls adapted to define exterior surfaces of the product;

b) providing a support for supporting said resilient insert while a product is cast in said insert cavity and at least one flexible tether securing said insert to said support to allow restricted movement of said insert relative to said support;

c) casting a product in said insert cavity; and d) after said cast product has cured, separating said cast product from said insert by pulling said insert away from said support until said insert is sufficiently distorted by said at least one tether to allow said cast product to be separated from said insert.

11. A method for casting a concrete product, as set forth in claim 10, and each at least one tether provided is a flat flexible strap having an end embedded in said resilient insert.

12. A method for casting a concrete product, as set forth in claim 10, and wherein said cast product is separated from the insert by lifting said cast product until said insert reaches the end of the tether and the insert is caused to deform until the product is separated from the insert and the insert falls back to the support.

13. A method for casting a concrete product, as set forth in claim 12, and each at least one tether provided is a flat flexible strap having an end embedded in said resilient insert.

14. A method for casting a concrete product, as set forth in claim 10, and wherein said cast product is separated from the insert by inverting said support, allowing the insert to fall away from the support a until it reaches the end of the tether and is sufficiently deformed to allow the product to separate from the insert, and further including the step of returning the support to a position wherein the insert falls back to a position wherein it is supported for casting another product.

15. A method for casting a concrete product, as set forth in claim 14, and each at least one tether provided is a flat flexible strap having an end embedded in said resilient insert.

* * * * *